United States Patent [19]
Falke et al.

[11] Patent Number: 5,907,949
[45] Date of Patent: Jun. 1, 1999

[54] STARTING FUEL CONTROL METHOD FOR A TURBINE ENGINE

[75] Inventors: Charles H. Falke, Union; Jason S. Pettengill, Glastonbury; Barry L. Priest, Ellington, all of Conn.

[73] Assignee: United Technologies Corporation, Hartford, Conn.

[21] Appl. No.: 08/792,418

[22] Filed: Feb. 3, 1997

[51] Int. Cl.[6] .................................................. F02C 7/26
[52] U.S. Cl. ................................. 60/39.06; 60/39.141
[58] Field of Search ......................... 60/39.06, 39.141, 60/39.281

[56] References Cited

U.S. PATENT DOCUMENTS

| | | | |
|---|---|---|---|
| 2,637,165 | 5/1953 | Stockinger | 60/39.09 |
| 3,520,133 | 7/1970 | Loft et al. | 60/39.141 |
| 3,964,253 | 6/1976 | Paduch et al. | 60/39.14 |
| 4,245,462 | 1/1981 | McCombs, Jr. | 60/39.14 |
| 4,321,791 | 3/1982 | Carroll | 60/39.14 |
| 4,350,008 | 9/1982 | Zickwolf, Jr. | 60/39.14 |
| 5,101,619 | 4/1992 | Morris et al. | 60/39.06 |
| 5,129,221 | 7/1992 | Walker et al. | 60/39.141 |
| 5,345,757 | 9/1994 | MacLean et al. | 60/39.141 |

*Primary Examiner*—Louis J. Casaregola
*Attorney, Agent, or Firm*—Kenneth C. Baran

[57] ABSTRACT

A method for reliably starting a gas turbine engine includes commanding a rapid transient enrichment of the fuel quantity delivered to the engine combustion chamber, maintaining the fuel quantity at the enriched level while operating the engine's ignition system, and, upon the expiration of a fixed time interval or an indication of successful ignition, commanding a derichment to a fuel quantity equal to that which would be obtained during a conventional startup procedure. The degree of transient enrichment depends on the operating environment and operational state of the engine. In one embodiment of the invention the rate of enrichment corresponds to a virtual step change in the commanded fuel quantity and the rate of derichment is less than the rate of enrichment.

12 Claims, 5 Drawing Sheets

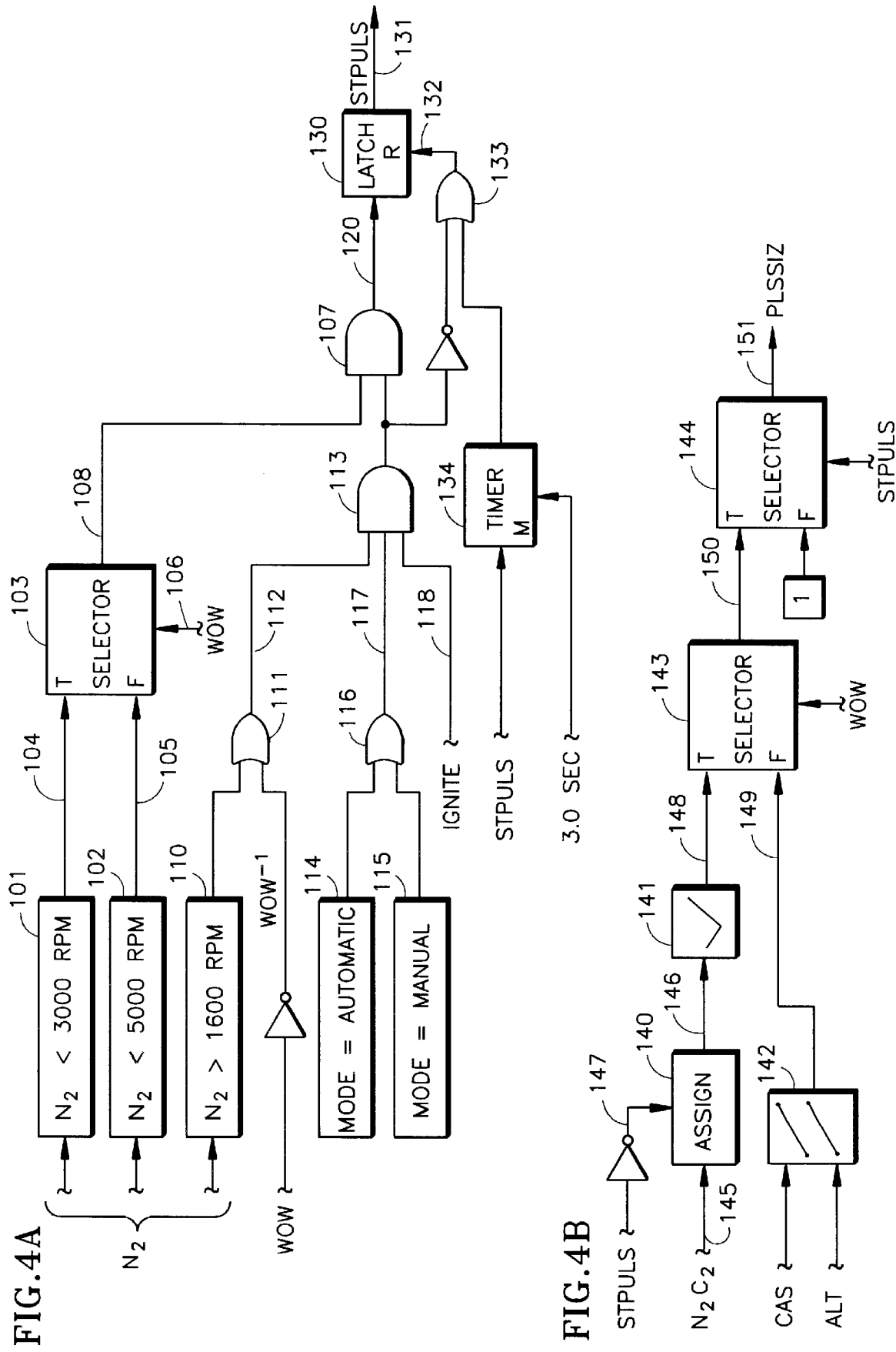

STARTING FUEL CONTROL METHOD FOR A TURBINE ENGINE

TECHNICAL FIELD

This invention relates to gas turbine engines, and particularly to a method for reliably starting an aircraft gas turbine by judiciously managing the introduction of fuel during the engine start sequence.

BACKGROUND OF THE INVENTION

Gas turbine engines, particularly those used for aircraft propulsion, must be capable of being reliably started under a wide variety of environmental and operational conditions. For example, ground starts of an aircraft engine may take place at airports whose elevations range from approximately sea level to over 14000 feet. In addition, it is desirable to restart an engine which has become temporarily disabled in flight. These in-flight starts, customarily referred to as airstarts, are conducted while the aircraft is moving forward at a considerable velocity and at altitudes which may exceed 40000 feet.

The ability to reliably start an aircraft engine is important to aircraft operators and airport operators alike. Trouble free ground starting minimizes the likelihood of aircraft departure delays which engender passenger dissatisfaction and disrupt operations at busy, congested airports. Reliable and successful airstarting of a temporarily disabled engine is obviously desirable, even on multi-engine aircraft, to restore full propulsive power to the aircraft.

Among the factors which can inhibit successful engine starting is circumferential or radial nonuniformity of the fuel-air ratio in the interior of the engine's combustion chamber. For example, the overall ratio of fuel to air in the combustion chamber may be well within the limits for achieving a successful start, but the fuel-air ratio may be excessively lean in the immediate vicinity of the engine ignitors. Nonuniformities in the fuel-air ratio may arise from a number of causes such as uneven distribution of the airstream flowing through the combustion chamber, irregularities in the spray pattern of fuel issuing from the fuel injectors or inadequate atomization of the fuel.

One obvious way to mitigate an inability to start is, of course, to identify and correct the underlying cause of the problem. Unfortunately, the identification of a root cause can require considerable time and effort with no guarantee of success. Even if the cause is accurately determined, it may not be possible to readily implement corrective measures, particularly if those measures include modifications to the fuel injectors, combustion chamber or other internal engine hardware. Such modifications are especially objectionable if the affected hardware is subject to time consuming and costly development and if the hardware must be retrofit into existing engines.

Hardware modifications are also unappealing in view of the common practice among aircraft engine manufacturers of producing multiple, closely related variants or models of engines within a generic engine family. A hardware modification which successfully mitigates an inability to start one engine model within a family may be nonoptimal or completely ineffective for a related model in the same family. Thus, a starting problem which affects multiple models of an engine family may compel the engine manufacturer to develop a number of model specific hardware modifications. The resultant absence of hardware commonality within the family complicates maintenance and repair logistics and is objectionable to the engine's owner.

Another potential solution is to simply replace the exciters, which apply voltage across the ignitors to generate electrical sparks, with exciters of higher capacity so that the ignitor sparks extend further from the ignitors and into a region of the combustion chamber where the fuel-air ratio is more favorable for ignition. Since the exciters are mounted on the exterior of the engine and are readily available in a variety of capacities, this approach may be less objectionable than one which involves modifications or changes to internal engine hardware. However even if the more energetic sparks are capable of reaching a region of adequate fuel-air ratio within the combustion chamber, the expense of higher capacity exciters makes this option unappealing. Higher capacity exciters also add weight and consume additional space—distinct disadvantages in aircraft applications—and may reduce ignitor life.

Another possible strategy is to enrich the fuel-air mixture near one or more of the ignitors during the engine start sequence by distributing a disproportionate share of the engine's fuel to the fuel injectors in the vicinity of the ignitors. Such fuel reapportionment may be effected by changes or adjustments to a fuel metering unit in the engine's fuel system. However, as is the case with other hardware modifications, changes or adjustments to the metering unit introduce undesirable hardware noncommonality into an engine family.

Yet another possible solution is to adjust the behavior of the engine controller, a device which automatically regulates various aspects of engine operation. Gas turbine engine controllers customarily include a starting fuel schedule which governs the quantity of fuel delivered to the combustion chamber during engine starting. Since the starting fuel schedule is typically adjustable, the schedule can be raised to increase the quantity of fuel delivered during an engine start, thereby increasing the likelihood of successful ignition. Such an increase, however, affects the quantity of fuel delivered throughout the entire duration of the start, not just during the ignition phase of the start. Once ignition has occurred, the increased fuel quantity causes the engine to accelerate so rapidly that the aerodynamic stability of the engine compressors is compromised and the engine is unable to complete its acceleration to idle speed.

SUMMARY OF THE INVENTION

It is, therefore, an object of the invention to improve the starting reliability of a turbine engine across a wide range of operational and environmental conditions.

It is another object of the invention to improve engine starting reliability without introducing hardware changes into the engine and without introducing hardware noncommonality into an engine family.

It is a further object of the invention to improve the success rate of turbine engine starting in a manner which is readily adaptable to engine variants within an engine family and which can be conveniently applied to existing engines.

According to the invention, reliable starting of a turbine engine is ensured by commanding a rapid transient enrichment of the fuel quantity delivered to the engine combustion chamber, maintaining the fuel quantity at its enriched level while operating the ignition system and, upon the occurrence of a predefined event, commanding a derichment to a fuel quantity equal to that which would be obtained during a conventional startup procedure.

According to one embodiment of the invention, the degree of transient enrichment depends on the operating environment and operational state of the engine.

According to another embodiment of the invention, the predefined event is the expiration of a time interval sufficiently long to maximize the likelihood of ignition but short enough to minimize accumulation of fuel in the combustion chamber in the event that ignition is unsuccessful, and also short enough to preclude excessively rapid engine acceleration in the event of successful ignition. In yet another embodiment of the invention the predefined event is an indication of successful ignition.

According to one detailed embodiment of the invention in which a digital electronic controller issues commands to the engine's fuel system, the controller increases a mass flow rate command at a rise rate corresponding to a virtual step change and, after the expiration of a time interval, decreases the mass flow rate command at a decay rate which is slower than the rise rate.

The starting method of the present invention is advantageous in several respects. The method is universally applicable to ground starts and airstarts and improves the success rate of engine starting over a wide range of altitude, airspeed and air temperature. Since the method can be programmed into the software of a digital electronic controller, it is readily adaptable to engine variants within an engine family and therefore avoids the complications of hardware non-commonality within the family. Furthermore, the starting capability of existing engines can be upgraded by simple, convenient updates to the software of their control systems. Since implementation of the method is not dependent upon the development of new or modified engine hardware (e.g. combustion chambers and fuel injectors), the associated expense and delay are avoided. The expense and added weight of higher capacity exciters is likewise avoided.

The foregoing advantages and the features and operation of the invention will become more apparent in light of the following description of the best mode for carrying out the invention and the accompanying drawings.

BRIEF DESCRIPTION OF THE DRAWINGS

FIGS. 4a through 4d are flow diagrams of a logic network representing the method of the present invention in a form suitable for incorporation in a digital electronic controller.

BEST MODE FOR CARRYING OUT THE INVENTION

Figure 1:
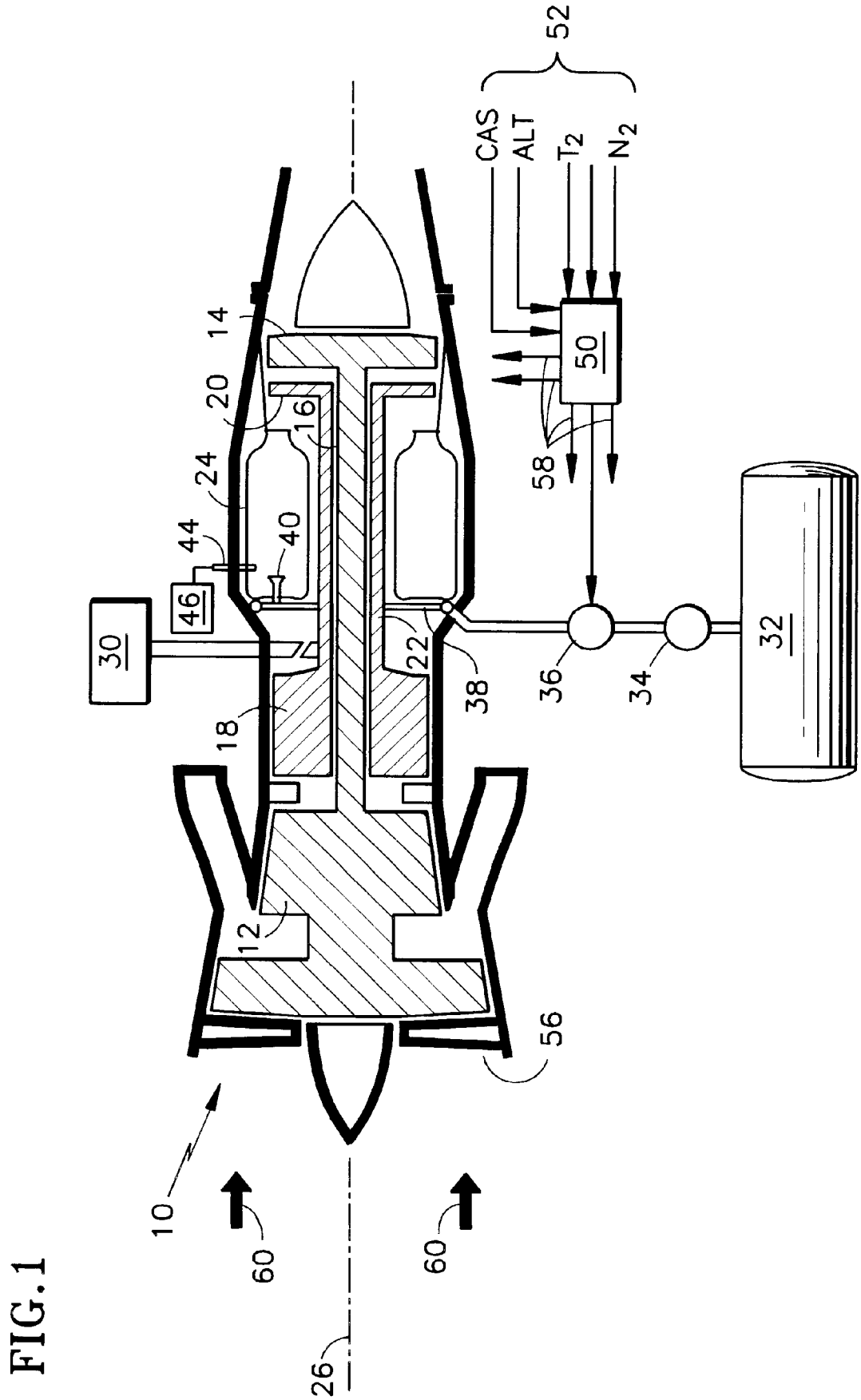
FIG. 1 is a schematic cross sectional side view of a turbofan gas turbine engine.

Referring to FIG. 1, a gas turbine engine 10 of the type used for aircraft propulsion includes a low speed rotor comprising a low speed compressor 12 and a low speed turbine 14 interconnected by a low speed shaft 16, a high speed rotor comprising a high speed compressor 18 and a high speed turbine 20 interconnected by a high speed shaft 22, and a combustion chamber 24. The high and low speed shafts are concentric and the rotors are independently rotatable about a longitudinally extending central axis 26. The engine's auxiliary equipment includes a starter motor 30 for rotating the high speed rotor during engine startup. A fuel system for regulating the delivery of fuel to the engine includes fuel storage tank 32, fuel pump 34 fuel metering unit 36, fuel supply manifold 38 and a set of circumferentially distributed fuel injectors 40 extending from the manifold and into the interior of the combustion chamber. An engine ignition system includes one or more circumferentially separated ignitors 44 each of which extends into the combustion chamber in the vicinity of one of the fuel injectors, and exciters 46 for applying a voltage across each ignitor.

The engine is also equipped with a control system which includes a digital electronic controller 50. The controller receives signals 52 indicative of the operating environment and operational state of the engine. Among these signals are those corresponding to the calibrated airspeed CAS and altitude ALT of the aircraft, the stagnation or total temperature $T_2$ at engine intake 56 and the mechanical speed $N_2$ of high speed rotor. A variety of command signals 58 are issued by the controller to command the operation of the metering unit 36 and other equipment installed on the engine.

During a typical ground start, the starter motor rotates the high speed rotor so that ambient air 60 is drawn through the engine. Once the starter motor has accelerated the rotor to a sufficiently high rotational speed, the exciters apply a voltage across each of the ignitors, and the fuel metering unit supplies fuel to the combustion chamber, the quantity of fuel being determined by a starting fuel schedule programmed into the controller. The voltage across the ignitors generates an electrical spark which, if the fuel and air are properly proportioned and mixed, ignites the fuel-air mixture resulting in further acceleration of the rotor. After the rotor has accelerated to (or above) a speed at which the assistance of the starter is no longer required (referred to as the self sustaining speed) the starter is disengaged and the engine accelerates to idle speed.

A typical airstart sequence is similar to the above described ground start sequence, however the action of the starter motor may be unnecessary since the high speed rotor is usually rotating or "windmilling" as a consequence of the aircraft's forward velocity. Elements of both the ground start sequence and the airstart sequence can be executed manually by the aircraft crew. For example, depending on the specific type of aircraft in question, the crew may be able to command the engagement and disengagement of the starter motor and the operation of the ignitors. The crew may also be able to manually command the initial introduction of fuel into the combustion chamber, although the precise quantity of fuel metered to the combustion chamber remains under the authority of the controller 50. Alternatively, the crew can signal the controller to carry out the start sequence autonomously, without further crew intervention.

In the accompanying description of the invention, the phrase "fuel flow" refers to the mass flow rate of fuel (or the corresponding is mass flow rate command issued by the controller) expressible in units of mass per unit time. The phrase "fuel flow rate" is the rate of change of fuel flow (or the corresponding commanded rate of change), expressible in units of mass per unit time per unit time.

Figure 2:
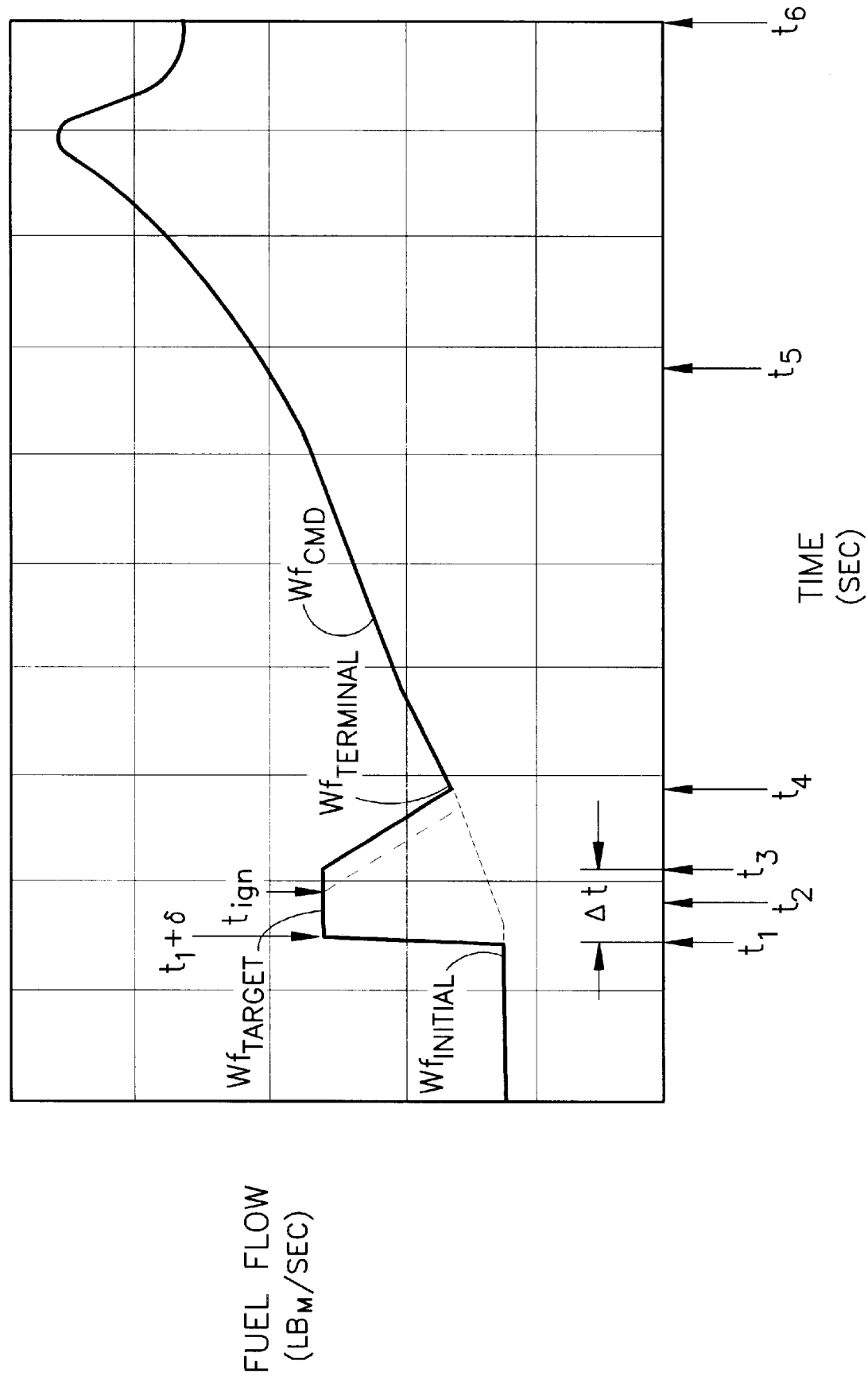
FIG. 2 is a graph comparing the turbine engine starting method of the present invention to an engine start carried out under the authority of a conventional starting fuel schedule programmed into the engine's controller.

Referring now to FIG. 2, a fuel flow command $Wf_{cmd}$ (solid line) corresponding to the method of the present invention is compared to an analogous command (broken line) for a start carried out under the authority of a conventional starting fuel schedule programmed into the controller. Each major division along the horizontal axis represents five seconds of time and each major division along the vertical axis represents 500 pounds per hour of fuel flow. Those skilled in the art will recognize that the actual fuel flow supplied to the combustion chamber deviates slightly from the commanded fuel flow shown in the figure due to factors such as the volume of the fuel manifold 38 and the inertia of the moving parts in the metering unit 36.

As seen in FIG. 2, the fuel flow command issued by the controller is increased from an initial value $Wf_{initial}$ to a target value $Wf_{target}$ at a predetermined rate of change or rise rate. The target value, $Wf_{target}$, varies as a function of the engine's operating environment and operational state just prior to the onset of the change. The change in fuel flow command begins at time $t_1$ and is accompanied by the application of electrical power to the exciters and, a short time thereafter, the resultant presence of a spark inducing voltage across the ignitors. The fuel flow command reaches the target value at time $t_1+\delta$ where $\delta$ is a time interval sufficiently small that the rise rate corresponds to a virtual step change. As implemented in the digital electronic controller of FIG. 1, $\delta$ is 24 milliseconds and corresponds to the update interval between successive fuel flow command calculations. Slower rise rates may also be employed although it is desirable that the fuel flow command be increased quickly enough that the fuel flow supplied to the engine combustion chamber approximates the commanded target value when a spark inducing voltage first appears across the ignitor.

The fuel flow command is maintained at the target value and the ignition system continues to operate until the occurrence of a predefined event such as the expiration of a fixed time interval $\Delta t$ at time $t_3$. Time interval $\Delta t$ may be as short as the above described update interval provided that the fuel system responds quickly enough to supply the combustion chamber with enough fuel to support ignition. Interval $\Delta t$ must also be long enough that at least one spark, and preferably multiple sparks, are generated by the ignitors during the interval. Otherwise, a longer interval may be advisable to maximize the likelihood of successful ignition. The interval is also short enough to minimize the accumulation of uncombusted fuel in the combustion chamber in the event that ignition is unsuccessful. In the controller 50 of FIG. 1, time interval $\Delta t$ is 3.0 seconds. Alternatively, the predefined event may be an indication of successful ignition, as shown at time $t_{ign}$, communicated to the controller 50 by way of one of the control signals 52 (FIG. 1). In practice, the indication of successful ignition may be based on engine pressures, temperatures or other parameters known to be responsive to ignition.

Upon the occurrence of the predefined event, the fuel flow command is decreased from the target value to a terminal value $Wf_{terminal}$ at a predetermined decay rate. The terminal value is reached at time t4 and is the fuel flow corresponding to the conventional starting fuel schedule programmed into the controller. Since the speed of the high speed rotor will have increased during the start sequence, and since the starting fuel schedule calls for increased or undiminished fuel flow with increased rotor speed, the terminal value is no less than the initial value. The engine start sequence continues under the authority of the starting fuel schedule and the engine accelerates past its self sustaining speed at time $t_5$ and stabilizes at idle at time $t_6$.

For simplicity of implementation, both the rise rate and decay rate are constants, that is, the fuel flow command increases and decreases linearly. However either or both rates may be made variable. The rise rate is a virtual step change so that the target fuel flow value is achieved as rapidly as possible thereby maximizing the opportunity for successful ignition. Ideally, the decay rate is smaller than the rise rate, particularly if the criterion for the onset of the decay is the expiration of a fixed time interval rather than an indication of successful ignition. The more modest decay rate provides an additional interval of opportunity for ignition to occur. Accordingly, the ignition system continues to operate at least until $t_4$, the time at which the commanded fuel flow is restored to the value corresponding to the conventional starting fuel schedule.

Figure 3:
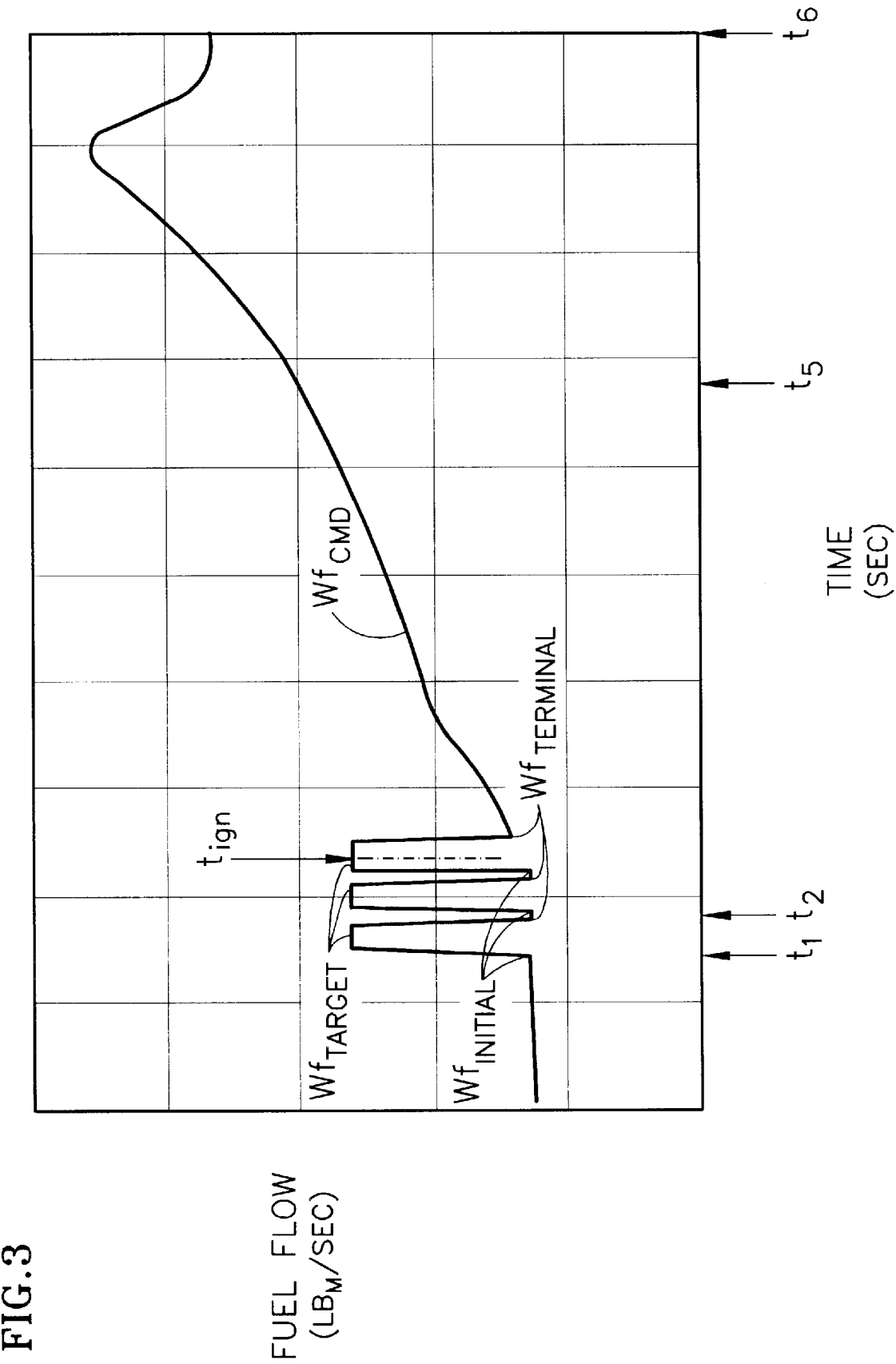
FIG. 3 is a graph similar to that of FIG. 2 and illustrating an alternative embodiment of the invention.

The present invention also embraces multiple enrichment cycles as illustrated in FIG. 3. According to the illustrated embodiment of the invention, the steps of increasing the fuel flow command to a target value, maintaining the command at the target value until the occurrence of a predefined event, and decreasing the command to a terminal value are repeated a limited number of times. In this embodiment the decay rate of each enrichment cycle is equal to or nearly as large as the rise rate to minimize the delay between successive cycles. As also seen in FIG. 3, it may be desirable to interrupt the repetition of the enrichment cycles in response to an indication of successful ignition as shown at time $t_{ign}$. FIGS. 4a through 4d show a logic network for implementing the invention in a digital electronic controller. Standard symbols are used to represent Boolean operators AND, OR and NOT; nonstandard operations are described in the accompanying description. The illustrated implementation is one in which a fuel enrichment increment or "pulse" is added to the fuel flow commanded by a conventional starting fuel schedule and in which the expiration of a fixed time interval initiates the decay of the fuel flow pulse from its target value to its terminal value.

FIG. 4a illustrates the synthesis of a signal 131, mnemonically designated STPULS, which enables or disables the fuel flow pulse. COMPARITORS 101, 102, cooperate with SELECTOR 103 to determine if the rotational speed $N_2$ of the high speed rotor is low enough to justify the application of the fuel flow pulse. For example there may be one or more speed ranges over which the stall margin of compressors 12, 18 (FIG. 1) is insufficient to tolerate a rapid increase of fuel flow into the combustion chamber. Each COMPARITOR compares the rotational speed of the high speed rotor to a maximum threshold speed (3000 or 5000 revolutions per minute) and, based on the result of the comparison, communicates a signal 104, 105 having a TRUE or FALSE value to SELECTOR 103. The SELECTOR is responsive to a control signal 106, such as a weight-on-wheels signal WOW, to distinguish between ground operation and in-flight operation. Depending on the polarity of the WOW signal, the SELECTOR output signal 108 communicates the result of the appropriate speed comparison to AND gate 107. For example, if the aircraft is in flight the WOW signal is FALSE and the output of COMPARITOR 102 (TRUE if speed is below 5000 rpm and FALSE if speed is equal to or greater than 5000 rpm) is communicated to AND gate 107.

COMPARITOR 110 determines if the rotational speed of the high speed rotor is higher than a minimum threshold speed (1600 rpm). The effect of this comparison is nullified in flight to preserve the ability to conduct a windmill airstart (an airstart conducted without the assistance of the starter motor 30) irrespective of the windmilling speed of the high speed rotor. The nullification is effected by the complement, $WOW^{-1}$, of the weight-on-wheels signal and OR gate 111 whose output signal 112 is communicated to AND gate 113. During in-flight operation, $WOW^{-1}$ is always TRUE so that signal 112 is also TRUE and the desired nullification of the minimum threshold speed comparison is ensured.

COMPARITORS 114, 115, acting in conjunction with OR gate 116 determine if the aircraft crew has set an appropriate flight deck switch to request operation in one of the two starting modes, manual or automatic. If either starting mode has been requested, signal 117, which is communicated to AND gate 113, is TRUE.

The final condition for enabling or disabling the fuel flow pulse is the polarity of an IGNITE signal 118. The IGNITE signal is TRUE when electrical power is applied to the exciters and the fuel metering unit is commanded to supply fuel to the combustion chamber. In the manual starting mode, these two criteria are satisfied when the aircraft crew sets an appropriate flight deck switch. In the automatic start mode, the ignition and fuel metering commands are issued by the controller which then sets the IGNITE signal to TRUE.

As is clear from the figure, when signals 108, 112, 117 and 118 are all TRUE, output signal 120 from AND gate 107 is TRUE. Signal 120 is communicated to LATCH construct 130 thereby signifying that all required conditions for enabling the fuel pulse have been satisfied. The LATCH construct is a logical circuit whose output signal 131 becomes TRUE when its input signal 120 becomes TRUE. The output signal then remains TRUE, regardless of the polarity of the input, until reset signal 132 becomes TRUE at which time the output signal becomes FALSE. The reset signal 132 becomes TRUE if any one of signals 112, 117 or 118 become FALSE, i.e. if any of the enabling criteria other than the maximum threshold speed are violated. The maximum threshold speed criterion (signal 108) is not considered since it is anticipated that one of the other reset conditions, most likely the expiration of timer 134, will be satisfied prior to the attainment of the applicable threshold speed. Moreover, in the unlikely event that one of the other reset conditions is not satisfied, it is not desired to interrupt an ongoing pulse as the rotor accelerates through the maximum threshold. Due to the action of OR gate 133, the reset signal also becomes TRUE upon the expiration of TIMER 134. The TIMER starts when STPULS, the output of LATCH construct 130, becomes TRUE, and expires 3.0 seconds thereafter.

FIG. 4b illustrates the determination of an amplifier 151, mnemonically designated PLSSIZ, which establishes the peak amplitude of the fuel flow pulse. The amplifier is determined by means of an ASSIGN construct 140, arrays 141, 142 of tabular data and a pair of SELECTORS 143, 144. The ASSIGN construct is a logical circuit which assigns the value of its input 145 to its output 146 as long as control signal 147 is TRUE. Accordingly, the output signal is continually updated to reflect any changes in the input signal. When the control signal becomes FALSE, the ASSIGN construct discontinues updating the output signal so that the output signal remains fixed at the value corresponding to the most recent update. Tabular data array 141 expresses a peak amplifier for ground operation as a function of an engine parameter indicative of the operational state of the engine. In the illustrated embodiment, the operational state of the engine is indicated by $N_2/(T_2/T_{std})^{0.5}$, the rotational speed of the high speed rotor "corrected" to standard ambient conditions ($T_2$ is the absolute stagnation temperature at the engine intake and $T_{std}$ is a standard absolute temperature of 518.7° R.). Tabular data array 142 expresses a peak amplifier for in-flight operation as a function of the operating environment of the aircraft, specifically aircraft altitude ALT and calibrated airspeed CAS.

The corrected speed signal, abbreviated $N_2C_2$ in the figure, is the input signal communicated to the ASSIGN construct. As long as the fuel flow pulse is not enabled (i.e. STPULS as synthesized on FIG. 4a is FALSE) any changes in $N_2C_2$ are communicated to data array 141 so that the output 148 of the data array, which is the amplifier for ground operation, varies with $N_2C_2$. Once the fuel pulse is enabled, however, STPULS becomes TRUE and the ASSIGN construct discontinues updating output 146. Tabular array 141 is then entered with a fixed value of $N_2C_2$, specifically, the value just prior to enablement of the pulse, so that the value of ground amplifier 148 does not change as $N_2C_2$ increases during an engine start.

The amplifier 149 for in-flight operation is obtained from tabular array 142 as a function of altitude and calibrated airspeed signals, ALT and CAS respectively. Because the ALT and CAS signals change slowly, if at all, during an engine start, they are communicated directly to tabular array 142 without the intervention of an ASSIGN construct.

Amplifier signals 148, 149 are communicated to SELECTOR 143. Based on the polarity of the weight-on-wheels signal WOW, SELECTOR 143 conveys a signal 150 representing either the ground amplifier 148 or the in-flight amplifier 149 to SELECTOR 144. SELECTOR 144, operating in response to the pulse enablement signal STPULS, produces amplifier signal 151 (mnemonically designated PLSSIZ) equal to either signal 150, corresponding to a fuel pulse of finite amplitude, or to the value 1.0, corresponding to the absence of a fuel pulse.

Figure 4C:
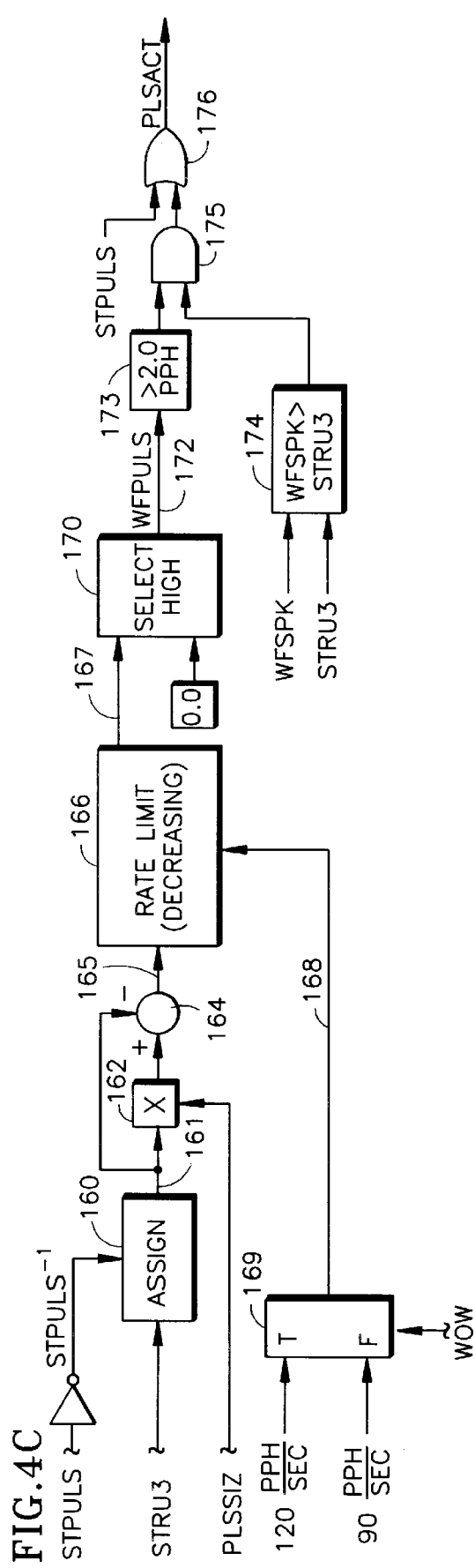

FIG. 4c illustrates the portion of the logic network which determines the actual amplitude of the fuel pulse and manages the rate at which the fuel flow command changes. ASSIGN construct 160 receives a generally time varying input signal STRU3 representative of the fuel flow commanded by a conventional starting fuel schedule (not shown). Multiplier 162 multiplies ASSIGN output signal 161 by the amplifier PLSSIZ (FIG. 4b) and the resulting product is reduced, at summing junction 164, by the ASSIGN output signal 161 to yield an intermediate signal 165. Thus, it is seen that when the fuel pulse is disabled (i.e. when STPULS is FALSE and its complement STPULS$^{-1}$ is TRUE) the value of PLSSIZ (from FIG. 4b) is 1.0 and time varying output signal 161 is merely subtracted from itself at summing junction 164 to yield an intermediate signal 165 whose value is zero. When the fuel pulse is enabled, PLSSIZ assumes a nonunity value based on the appropriate tabular array 141, 142 (FIG. 4b) and a constant value output signal 161 is used as the basis for computing a nonzero intermediate signal 165. Signal 165 represents a fuel flow magnitude expressible in units of mass per unit time.

Intermediate fuel flow command signal 165 is communicated to a RATE LIMIT construct 166. The RATE LIMIT accepts a generally time varying input signal, such as intermediate signal 165, and generates a corresponding output signal, such as signal 167, whose rate of change is restricted. The particular RATE LIMIT shown in the illustration is a negative rate limit which restricts the rate of decrease of output signal 167 but places no restriction on its rate of increase. The illustrated RATE LIMIT limits the rate of decrease of signal 167 to 120 pounds per hour per second (pph/sec) for ground operation and 90 pph/sec for in-flight operation depending on the output 168 of SELECTOR 169. SELECTOR 169 uses the polarity of the weight-on-wheels signal WOW to distinguish between ground and in-flight operation. The decreasing rate limit imposed by RATE LIMIT construct 166 corresponds to the finite decay rate of the fuel flow command observed in FIG. 2. The absence of any increasing rate limit corresponds to the virtual step increase observed in FIG. 2. A SELECT HIGH construct 170 selects the higher of its two inputs, signal 167 and the numerical value zero, thereby ensuring that the rate limited pulse amplitude signal 172, mnemonically designated WFPULS, remains positive.

COMPARITORS 173, 174, AND gate 175 and OR gate 176 cooperate to set the polarity of a signal PLSACT indicative of whether or not a previously enabled fuel flow pulse has decayed to its terminal value. Signal PLSACT is TRUE, signifying that the pulse has not decayed to its terminal value, anytime the pulse is enabled as indicated by STPULS being TRUE. Alternatively, PLSACT is TRUE if the rate and amplitude limited fuel pulse WFPULS exceeds a threshold (2.0 pph.) and if COMPARITOR 174 indicates that an intermediate fuel flow command WFSPK (described in the following discussion of FIG. 4*d*) is at least as large as the fuel flow signal STRU3 corresponding to the conventional starting schedule.

Figure 4D:
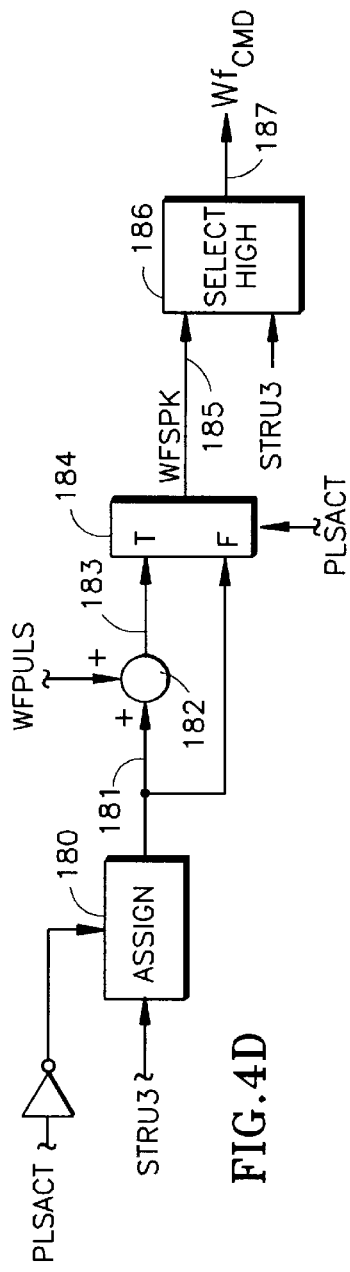

FIG. 4*d* illustrates the application of the fuel flow pulse, WFPULS to the fuel flow signal STRU3 issued by the conventional starting fuel schedule. As long as signal PLSACT is TRUE, ASSIGN construct 180 generates a nonaugmented output signal 181 indicative of the value of STRU3 just prior to enablement of the pulse. The nonaugmented signal is incremented by the amplitude of the fuel flow pulse, WFPULS, at summing junction 182. The resulting augmented signal 183, along with nonaugmented signal 181 are communicated to SELECTOR 184. SELECTOR 184, operating in response to the PLSACT signal, communicates a signal 185 to SELECT HIGH construct 186. Signal 185, mnemonically designated WFSPK, represents either the nonaugmented or augmented fuel flow command signal 181, 183 depending on whether or not the pulse has decayed to its terminal value as indicated by PLSACT. SELECT HIGH construct 186 ensures that signal 187, which is the fuel flow command signal $Wf_{cmd}$, is no lower than the fuel flow STRU3 requested by the starting fuel schedule.

We claim:

1. For a gas turbine engine having a combustor, a fuel system for supplying fuel to the combustor, a control system capable of issuing a fuel flow command to the fuel system, and an ignition system for providing a source of ignition, a method of starting the engine, characterized by:
   increasing the fuel flow command from an initial value to a target value at a rise rate corresponding to a virtual step change, the target value being a function of at least one of the operating environment of the engine and the operational state of the engine;
   maintaining the fuel flow command at the target value for a fixed time interval; and
   decreasing the fuel flow command from the target value to a terminal value at a decay rate which is slower than the rise rate.

2. For a gas turbine engine having a combustor, a fuel system for supplying fuel to the combustor, a control system capable of issuing a fuel flow command to the fuel system, and an ignition system for providing a source of ignition, a method of starting the engine, characterized by:
   increasing the fuel flow command from an initial value to a target value at a predetermined rise rate,
   maintaining the fuel flow command at the target value while operating the ignition system; and
   upon the occurrence of a predefined event, decreasing the fuel flow command from the target value to a terminal value at a predetermined decay rate, the terminal value being no less than the initial value and the decay rate being less than the rise rate.

3. For a gas turbine engine having a combustor, a fuel system for supplying fuel to the combustor, a control system capable of issuing a fuel flow command to the fuel system, and an ignition system for providing a source of ignition, a method of starting the engine, characterized by:
   increasing the fuel flow command from an initial value to a target value at a predetermined rise rate, the target value being a function of the operational airspeed of the engine;
   maintaining the fuel flow command at the target value while operating the ignition system; and
   upon the occurrence of a predefined event, decreasing the fuel flow command from the target value to a terminal value at a predetermined decay rate, the terminal value being no less than the initial value.

4. For a gas turbine engine operable in a ground mode and in an in-flight mode and having a combustor, a fuel system for supplying fuel to the combustor, a control system capable of issuing a fuel flow command to the fuel system, and an ignition system for providing a source of ignition, a method of starting the engine, characterized by:
   increasing the fuel flow command from an initial value to a target value at a predetermined rise rate, the target value being a function of the operating environment of the engine in the in-flight mode and of the operational state of the engine in the ground mode;
   maintaining the fuel flow command at the target value while operating the ignition system; and
   upon the occurrence of a predefined event, decreasing the fuel flow command from the target value to a terminal value at a predetermined decay rate, the terminal value being no less than the initial value.

5. The method of claim 2, 3 or 4 characterized in that the rise rate is a virtual step change.

6. The method of claim 3 or 4 characterized in that the rise rate exceeds the decay rate.

7. The method of claim 2, 3 or 4 characterized in that the rise rate and the decay rate are constants.

8. The method of claim 2, 3 or 4 characterized in that the predefined event is the expiration of a time interval.

9. The method of claim 2, 3 or 4 characterized in that the predefined event is an indication of a successful ignition.

10. The method of claim 2, 3 or 4 characterized in that the predefined event is the expiration of a time interval substantially equal to a control system calculation update interval.

11. The method of claim 2, 3 or 4 characterized in that the predefined event is the expiration of a time interval and the increasing, maintaining and decreasing steps are repeated a limited number of times.

12. The method of claim 2, 3 or 4 characterized in that the predefined event is the expiration of a time interval, the increasing, maintaining and decreasing steps are repeated a limited number of times, and repetition of the increasing, maintaining and decreasing steps is interrupted in response to an indication of successful ignition.

* * * * *